(12) United States Patent
Shimogai et al.

(10) Patent No.: US 12,184,147 B2
(45) Date of Patent: Dec. 31, 2024

(54) DRIVE DEVICE AND VEHICLE

(71) Applicant: NIDEC CORPORATION, Kyoto (JP)

(72) Inventors: Daiki Shimogai, Kyoto (JP); Masafumi Ishimatsu, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 266 days.

(21) Appl. No.: 17/851,042

(22) Filed: Jun. 28, 2022

(65) Prior Publication Data

US 2023/0006500 A1    Jan. 5, 2023

(30) Foreign Application Priority Data

Jun. 30, 2021 (JP) ................................ 2021-108482

(51) Int. Cl.
    *H02K 5/124*      (2006.01)
    *H02K 5/173*      (2006.01)
    *H02K 7/116*      (2006.01)

(52) U.S. Cl.
    CPC ............ *H02K 5/124* (2013.01); *H02K 5/1732* (2013.01); *H02K 7/116* (2013.01)

(58) Field of Classification Search
CPC .. H02K 9/08; H02K 9/10; H02K 9/14; H02K 9/22; H02K 9/24; H02K 9/26; H02K 9/28; H02K 9/20; H02K 9/223; H02K 9/06; H02K 9/00; H02K 9/02; H02K 1/20; H02K 1/02; H02K 1/2791; H02K 1/32; H02K 1/06; H02K 1/08; H02K 1/14; H02K 1/16; H02K 1/22; H02K 1/24; H02K 1/27; H02K 1/274; H02K 1/2766

See application file for complete search history.

(56) References Cited

U.S. PATENT DOCUMENTS

| | | | |
|---|---|---|---|
| 7,193,836 B2 | 3/2007 | Oh et al. | |
| 11,088,582 B2* | 8/2021 | Graves | H01M 10/6567 |
| 11,121,608 B2 | 9/2021 | Huber et al. | |
| 2013/0057096 A1 | 3/2013 | Okada et al. | |

(Continued)

FOREIGN PATENT DOCUMENTS

| | | |
|---|---|---|
| CN | 108173386 A | 6/2018 |
| JP | 2000316251 A | 11/2000 |
| JP | 2001157394 A | 6/2001 |

(Continued)

OTHER PUBLICATIONS

Makino et al.; "Motor and Drive Device"; U.S. Appl. No. 17/848,396, filed Jun. 24, 2022, 74pp.

(Continued)

*Primary Examiner* — Bryan R Perez
(74) *Attorney, Agent, or Firm* — HAUPTMAN HAM, LLP (57) ABSTRACT

A drive device includes a shaft, a rotor, a stator, a bearing, a housing, a first neutralizing device, and a seal member. The shaft extends in the axial direction along a rotation axis. The rotor is fixed to the shaft and is rotatable about the rotation axis. The stator faces the rotor with a gap therebetween in the radial direction. The bearing rotatably supports the shaft. The housing accommodates the rotor, the stator, and the bearing. The first neutralizing device is arranged on one axial side of the bearing and electrically connects the shaft and the housing. The seal member is arranged between the bearing and the first neutralizing device in the axial direction.

13 Claims, 7 Drawing Sheets

(56) References Cited

U.S. PATENT DOCUMENTS

2015/0256054 A1* 9/2015 Northwall .............. H02K 11/40
                                                             310/68 C
2018/0156272 A1* 6/2018 Oohara ............... F16C 33/6677

FOREIGN PATENT DOCUMENTS

| JP | 20104695 A | 1/2010 |
| JP | 2019192491 A | 10/2019 |

OTHER PUBLICATIONS

Makino et al.; "Motor"; U.S. Appl. No. 17/676,819, filed Feb. 22, 2022, 73pp.
Nakamura et al.; "Drive Device and Vehicle"; U.S. Appl. No. 17/852,396, filed Jun. 29, 2022, 59pp.
Shiraishi et al.; "Drive Device and Vehicle"; U.S. Appl. No. 17/852,367, filed Jun. 29, 2022, 66pp.

* cited by examiner

DRIVE DEVICE AND VEHICLE

CROSS-REFERENCE TO RELATED APPLICATIONS

The present invention claims priority under 35 U.S.C. § 119 to Japanese Patent Application No. 2021-108482 filed on Jun. 30, 2021, the entire content of which is incorporated herein by reference.

FIELD OF THE INVENTION

The present invention relates to a drive device and a vehicle.

BACKGROUND

Conventionally, a neutralizing device that eliminates static electricity from a shaft of a motor portion of a drive device has been known. For example, a charge dissipating assembly, which serves as a neutralizing device, contacts a radially outer surface of a shaft to ground a shaft voltage.

However, if foreign matter adheres to the neutralizing device, the efficiency of eliminating the static electricity of the shaft by the neutralizing device may decrease. For example, in an in-vehicle drive device, a lubricating oil, a refrigerant for cooling a motor portion, and the like may adhere to a neutralizing device. At this time, there is a possibility that the conductivity of the neutralizing device decreases. In addition, there is a possibility that a defect in electrical connection between the neutralizing device and the shaft occurs.

SUMMARY

An exemplary drive device of the present invention includes a shaft, a rotor, a stator, a bearing, a housing, a first neutralizing device, and a seal member. The shaft extends in an axial direction along a rotation axis. The rotor is fixed to the shaft and is rotatable about the rotation axis. The stator radially faces the rotor with a gap interposed therebetween. The bearing rotatably supports the shaft. The housing accommodates the rotor, the stator, and the bearing. The first neutralizing device is arranged on one axial side of the bearing, and electrically connects the shaft and the housing. The seal member is arranged between the bearing and the first neutralizing device in the axial direction.

An exemplary vehicle of the present invention includes the drive device described above.

The above and other elements, features, steps, characteristics and advantages of the present disclosure will become more apparent from the following detailed description of the preferred embodiments with reference to the attached drawings.

DETAILED DESCRIPTION

Hereinafter, an exemplary preferred embodiment will be described with reference to the drawings.

Figure 1:
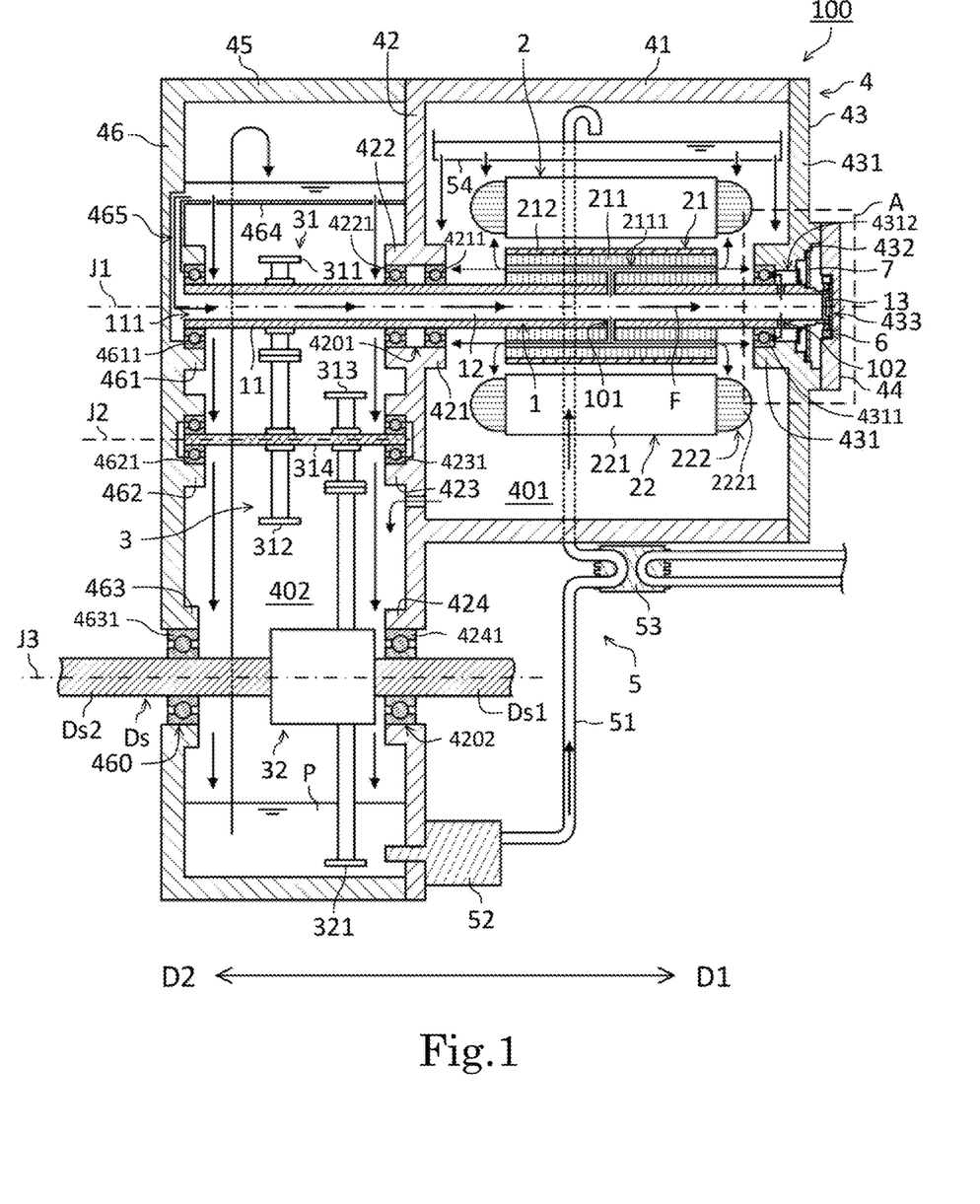
FIG. 1 is a conceptual diagram illustrating a configuration example of a drive device.

In the present specification, a direction parallel to a rotation axis J1 of a motor portion 2 is referred to as an "axial direction" of a drive device 100. In the axial direction, as illustrated in FIG. 1, a motor portion 2 side is defined as one axial side D1, and a gear portion 3 side is defined as the other axial side D2. In addition, a radial direction orthogonal to a predetermined axis, such as the rotation axis J1, is simply referred to as a "radial direction", and a circumferential direction around the predetermined axis, such as the rotation axis J1, is simply referred to as a "circumferential direction".

In the present specification, in the positional relationship between any one of orientations, lines, and surfaces and another one, the term "parallel" means not only a state where both never cross each other no matter how long they extend, but also a state where both are substantially parallel. In addition, the term "perpendicular" includes not only a state where both intersect each other at 90 degrees, but also a state where both are substantially perpendicular. That is, the terms "parallel" and "perpendicular" each include a state where the positional relationship between both permits an angular deviation to a degree that does not depart from the gist of the present invention.

In the present specification, the term "extending" in a predetermined direction includes a configuration in which an extending direction is substantially the predetermined direction in addition to a configuration in which the extending direction is strictly the predetermined direction. That is, the term "extending" in the predetermined direction includes a configuration in which there is a directional deviation from the predetermined direction to an extent that does not depart from the gist of the present invention. The same applies to the term "expanding" in a predetermined direction.

Figure 2A:
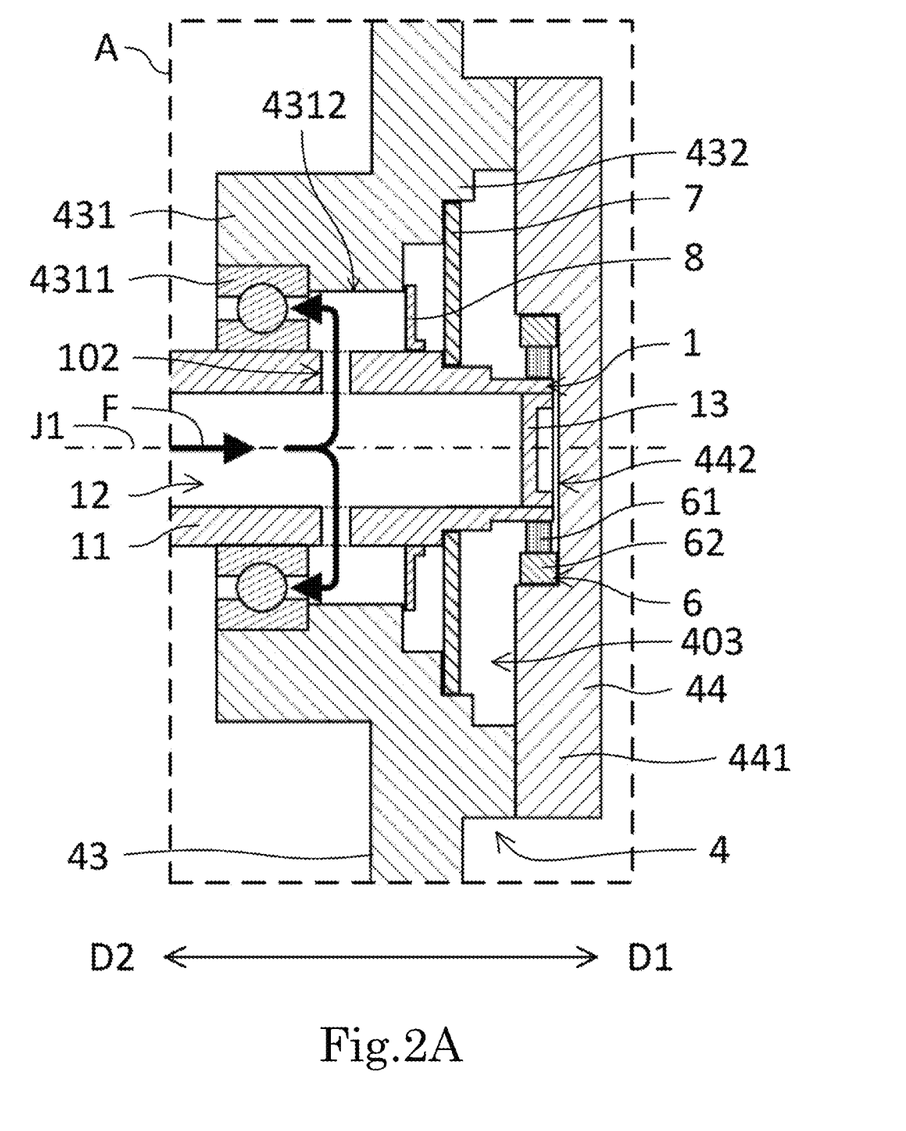
FIG. 2A is a conceptual diagram illustrating an example of a shaft neutralizing structure of the drive device according to the preferred embodiment.
Figure 2B:
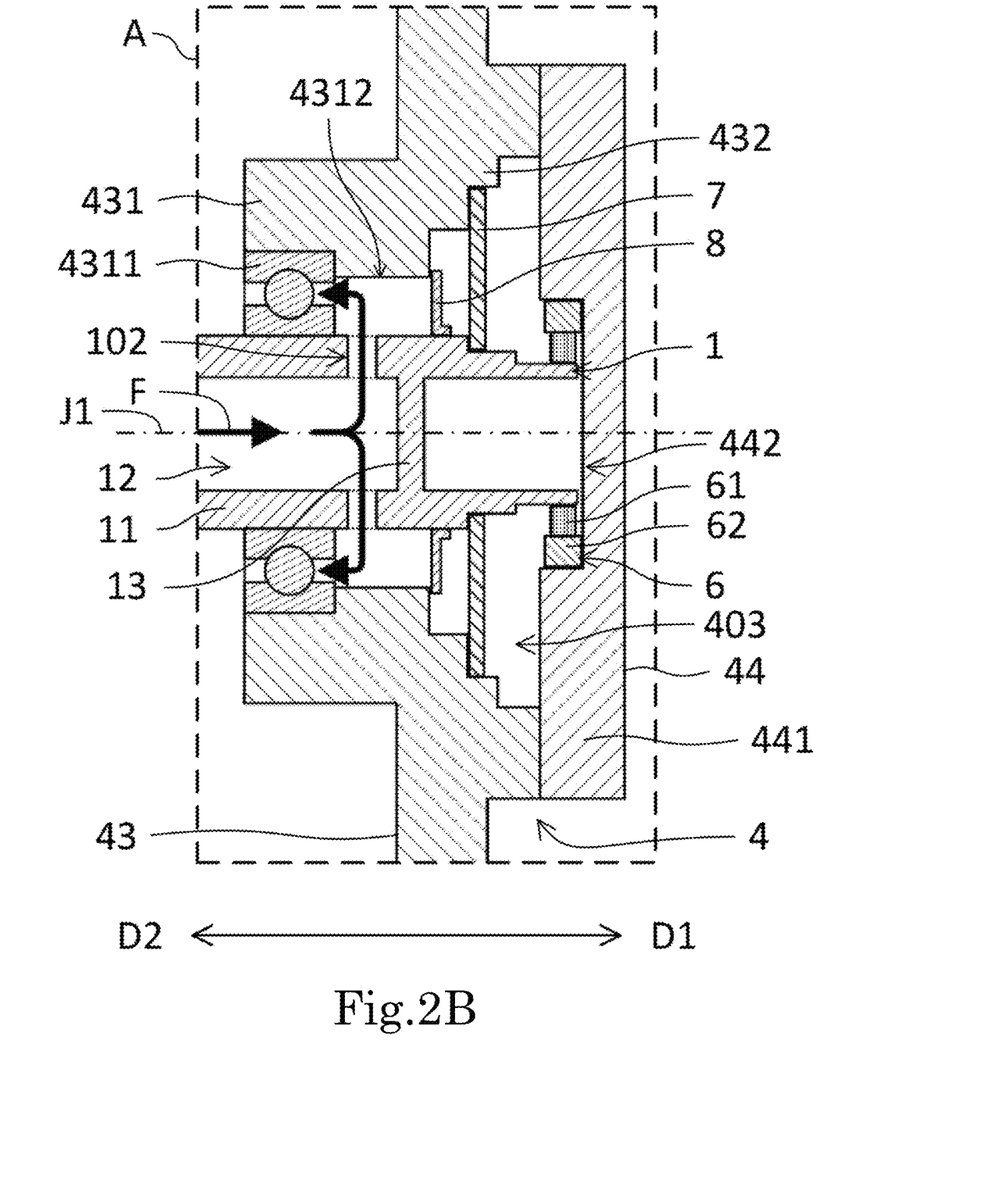
FIG. 2B is a conceptual diagram illustrating another example of the shaft neutralizing structure of the drive device according to the preferred embodiment.
Figure 3:
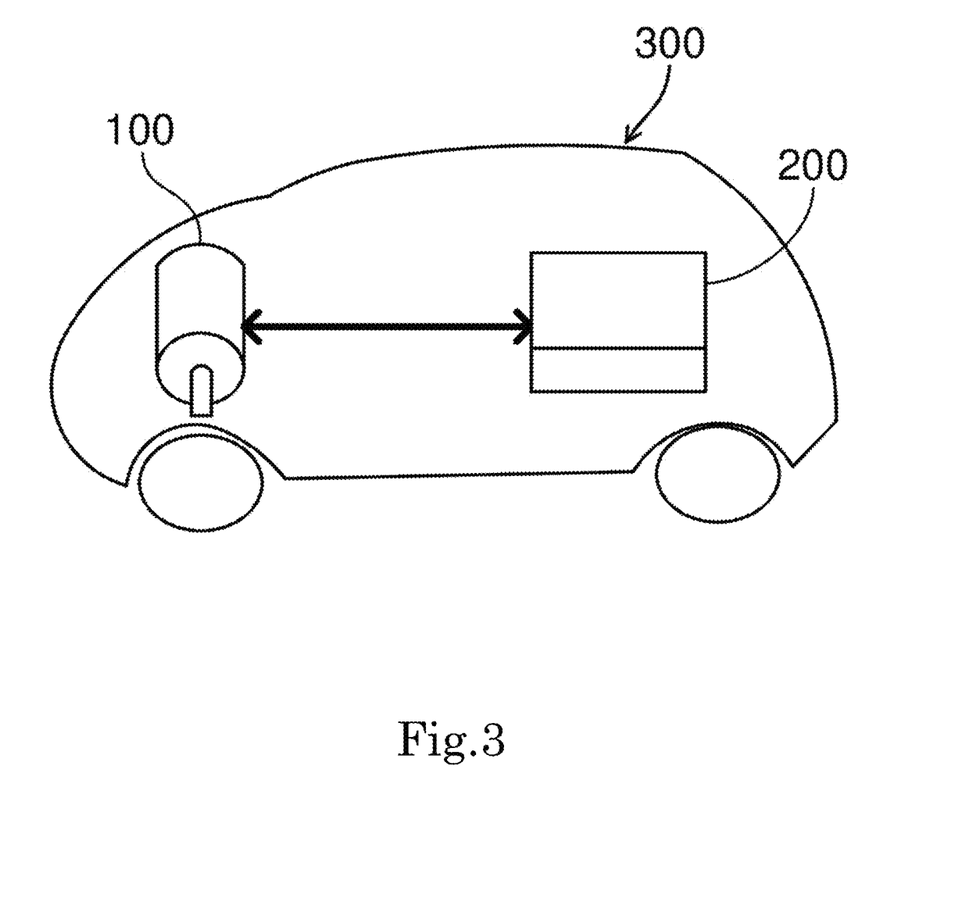
FIG. 3 is a schematic diagram illustrating an example of a vehicle having the drive device mounted thereon.

FIG. 1 is a conceptual diagram illustrating a configuration example of the drive device 100. FIG. 2A is a conceptual diagram illustrating an example of a shaft neutralizing structure of the drive device 100 according to the preferred embodiment. FIG. 2B is a conceptual diagram illustrating another example of the shaft neutralizing structure of the drive device 100 according to the preferred embodiment. FIG. 3 is a schematic diagram illustrating an example of a vehicle 300 having the drive device 100 mounted thereon. Note that FIGS. 1, 2A, and 2B are merely conceptual diagrams, and a layout and a dimension of each portion are not necessarily identical to those of the actual drive device 100 in a strict sense. In addition, FIGS. 2A and 2B are enlarged views of a portion A surrounded by a broken line in FIG. 1. In addition, FIG. 3 conceptually illustrates the vehicle 300.

In the present preferred embodiment, the drive device 100 is mounted on the vehicle 300 such as a hybrid vehicle (HV), a plug-in hybrid vehicle (PHV), or an electric vehicle (EV) in which at least the motor is used as a power source as illustrated in FIG. 3. The drive device 100 is used as the power source of the above-described vehicle 300. The vehicle 300 has the drive device 100. Since the drive device 100 is installed, the drive device 100 of the vehicle 300 including a neutralizing mechanism between a shaft 1 and a housing 4 can be downsized. In FIG. 3, the drive device 100 drives front wheels of the vehicle 300. Note that, the drive device 100 may drive at least any of the wheels. In addition, the vehicle 300 further includes a battery 200. The battery 200 stores electric power to be supplied to the drive device 100.

As illustrated in FIG. 1, the drive device 100 includes a shaft 1, a motor portion 2, a gear portion 3, a housing 4, a liquid circulation portion 5, a first neutralizing device 6, a rotation detector 7, and a seal member 8.

The shaft 1 axially extends along the rotation axis J1. As described above, the drive device 100 includes the shaft 1. The shaft 1 is rotatable about the rotation axis J1. As illustrated in FIG. 1, the shaft 1 is rotatably supported by the housing 4 via a first motor bearing 4211, a second motor bearing 4221, a third motor bearing 4311, and a fourth motor bearing 4611 to be described later. That is, the drive device 100 includes these bearings 4211, 4221, 4311, and 4611. These bearings 4211, 4221, 4311, and 4611 rotatably support the shaft 1.

The shaft 1 has a tubular shape extending in the axial direction. A fluid F flows inside the shaft 1. The drive device 100 further includes this fluid F. Note that the fluid F is a lubricant that lubricates the gear portion 3 and the bearings of the drive device 100, and is, for example, an automatic transmission fluid (ATF) in the present preferred embodiment. In addition, the fluid F is used as a refrigerant for cooling the motor portion 2 and the like. As the shaft 1 rotates, the fluid F flowing inside the shaft 1 can be supplied to the motor portion 2, the first motor bearing 4211, the third motor bearing 4311, and the like through a first shaft through-hole 101 to be described later. Therefore, a stator 22 (particularly, a coil end 2221 to be described later), the above-described bearings 4211 and 4311, and the like can be cooled by the fluid F.

Note that the shaft 1 may be dividable, for example, at an intermediate portion in the axial direction. When the shaft 1 is dividable, the divided shafts 1 are connected by spline fitting, for example. Alternatively, the divided shafts 1 may be connected by screw coupling using a male screw and a female screw, or may be joined by a fixing method such as press-fitting and welding. When the fixing method such as press-fitting or welding is adopted, serrations combining recesses and protrusions extending in the axial direction may be adopted. With such a configuration, it is possible to reliably transmit the rotation.

The shaft 1 includes a shaft tubular portion 11 having a tubular shape surrounding the rotation axis J1. The shaft tubular portion 11 has a tubular shape and extends in the axial direction along the rotation axis J1. The shaft tubular portion 11 has conductivity, and is made of metal in the present preferred embodiment. In addition, the shaft 1 includes a hollow portion 12 and an inlet 111. The hollow portion 12 is a space surrounded by an inner peripheral surface of the shaft tubular portion 11, and is arranged inside the shaft tubular portion 11. The inlet 111 is the other axial end portion of the shaft tubular portion 11 having the tubular shape, and is connected to a flow passage 465 of a gear lid 46 to be described later. The fluid F flows from the flow passage 465 into the hollow portion 12 through the inlet 111.

Next, the shaft 1 further includes a shaft wall 13. The shaft wall 13 is arranged inside the shaft tubular portion 11 and expands in the radial direction. The shaft wall 13 is arranged on the one axial side D1 of the shaft tubular portion 11.

In the present preferred embodiment, the shaft wall 13 is arranged on the one axial side D1 with respect to the seal member 8 as illustrated in FIG. 2A. However, an axial position of the shaft wall 13 is not limited to the example of FIG. 2A. The shaft wall 13 may be arranged at the same axial position as the seal member 8. For example, at least a part of the shaft wall 13 may overlap the seal member 8 when viewed from the radial direction. Alternatively, the shaft wall 13 may be arranged on the one axial side D1 with respect to a radially inner end portion of the second shaft through-hole 102 and on the other axial side D2 with respect to the seal member 8 as illustrated in FIG. 2B. For example, in the latter, one axial end portion of the shaft wall 13 may be arranged on the other axial side D2 with respect to the seal member 8. Then, an interval between the radially inner end portion of the second shaft through-hole 102 and the shaft wall 13 in the axial direction can be further narrowed. Therefore, for example, the fluid F flowing inside the shaft tubular portion 11 to the one axial side D1 easily flows to the second shaft through-hole 102, and the fluid F staying between the radially inner end portion of the second shaft through-hole 102 and the shaft wall 13 further decreases. Thus, the fluid F in the shaft tubular portion 11 can be more smoothly supplied to the third motor bearing 4311.

A radially outer end portion of the shaft wall 13 is connected to an inner surface of the shaft tubular portion 11. Preferably, the shaft wall 13 is integrated with the shaft tubular portion 11. For example, the shaft wall 13 and the shaft tubular portion 11 are mutually different parts of the same member in the present preferred embodiment. Since the shaft wall 13 is integrated with the shaft tubular portion 11, the shaft 1 can be easily manufactured. In addition, the number of components of the shaft 1 can be reduced, and thus, the drive device 100 is easily assembled. However, the present invention is not limited to this example, and the shaft wall 13 may be a separate member from the shaft tubular portion 11.

The first shaft through-hole 101 is arranged in the shaft tubular portion 11. That is, the shaft 1 further includes the first shaft through-hole 101 penetrating the shaft tubular portion 11 in the radial direction. The number of first shaft through-holes 101 may be one or plural. When the shaft 1 rotates, the fluid F in the shaft tubular portion 11 flows out from the hollow portion 12 to the outside of the shaft tubular portion 11 through the first shaft through-hole 101 by centrifugal force. In the present preferred embodiment, as illustrated in FIG. 1, the first shaft through-hole 101 is arranged on the one axial side D1 with respect to the other axial end portion of a rotor 21 and on the other axial side D2 with respect to one axial end portion of the rotor 21, and is connected to a rotor through-hole 2111 to be described later. However, the present invention is not limited to the example of FIG. 1, and the first shaft through-hole 101 may be arranged on the other axial side D2 with respect to the other axial end portion of the rotor 21 and on the one axial side D1 with respect to the first motor bearing 4211, and may be arranged on the one axial side D1 with respect to the one axial end portion of the rotor 21 and on the other axial side D2 with respect to the third motor bearing 4311. That is, at least a part of the first shaft through-hole 101 may be arranged in at least one of these positions. Note that the above-described example does not exclude a configuration in which the first shaft through-hole 101 and the rotor through-hole 2111 are omitted.

A second shaft through-hole 102 is arranged in the shaft tubular portion 11. The shaft 1 further includes the second shaft through-hole 102. The second shaft through-hole 102 penetrates the shaft tubular portion 11 in the radial direction. Alternatively, the second shaft through-hole 102 may penetrate the shaft tubular portion 11 in a direction intersecting the radial direction and the axial direction. Note that the second shaft through-hole 102 is an example of a "shaft through-hole" of the present invention.

The number of second shaft through-holes 102 may be one or plural. In the latter case, the second shaft through-holes 102 can be arranged at equal intervals or different intervals in the circumferential direction. Note that the above-described example does not exclude a configuration in which the second shaft through-hole 102 is omitted.

In the present preferred embodiment, the second shaft through-hole 102 is arranged at the one axial side D1 with respect to the first shaft through-hole 101 (see FIG. 1). A radially outer end portion of the second shaft through-hole 102 is connected between the third motor bearing 4311 and the seal member 8. In FIGS. 2A and 2B, the radially outer end portion of the second shaft through-hole 102 is connected to a third motor bearing holder 431. A radially inner end portion of the second shaft through-hole 102 is arranged on the other axial side D2 with respect to the shaft wall 13 and is connected to the hollow portion 12. Then, as the shaft 1 rotates, at least a part of the fluid F for lubricating and cooling that flows in the shaft tubular portion 11 flows between the third motor bearing 4311 and the seal member 8 through the second shaft through-hole 102, and is supplied to the third motor bearing 4311. Therefore, the fluid F in the shaft tubular portion 11 can be smoothly supplied to the third motor bearing 4311.

The radially outer end portion of the second shaft through-hole 102 is arranged on the one axial side D1 with respect to the third motor bearing 4311. Preferably, the radially outer end portion of the second shaft through-hole 102 is arranged on the other axial side D2 with respect to the one axial end portion of the opening 4312, which will be described later, of a housing lid 43. More preferably, the radially outer end portion of the second shaft through-hole 102 is arranged on the other axial side D2 with respect to the seal member 8. As described above, the radially outer end portion of the second shaft through-hole 102 is connected to the inside of the third motor bearing holder 431. For this reason, the fluid F hardly enters a space 403 to be described later in which the other axial end portion of the shaft tubular portion 11 is arranged as compared with a configuration in which the radially outer end portion of the second shaft through-hole 102 is arranged on the one axial side D1 with respect to the one axial end portion of the opening 4312 (that is, configuration in which the radially outer end portion of the second shaft through-hole 102 is connected to the outside of the third motor bearing holder 431). Therefore, it is possible to suppress the fluid F from being applied to the first neutralizing device 6 in the shaft tubular portion 11. Note that the above-described example does not exclude a configuration in which the radially outer end portion of the second shaft through-hole 102 is arranged on the one axial side D1 with respect to the one axial end portion of the opening 4312 or arranged on the one axial side D1 with respect to the seal member 8.

The motor portion 2 is a DC brushless motor. The motor portion 2 is a drive source of the drive device 100, and is driven by power from an inverter (not illustrated). That is, the motor portion 2 is an inner rotor type motor in which the rotor 21 is rotatably arranged inward of the stator 22. As illustrated in FIG. 1, the motor portion 2 includes the rotor 21 and the stator 22.

The rotor 21 is supported by the shaft 1. The drive device 100 includes the rotor 21. The rotor 21 is fixed to the shaft 1 and is rotatable about the rotation axis J1. The rotor 21 rotates when electric power is supplied from a power source unit (not illustrated) of the drive device 100 to the stator 22. The rotor 21 includes a rotor core 211 and a magnet 212. The rotor core 211 is formed by, for example, laminating thin electromagnetic steel plates. The rotor core 211 is a cylindrical body extending along the axial direction, and is fixed to a radially outer surface of the shaft 1. A plurality of the magnets 212 are fixed to the rotor core 211. The plurality of magnets 212 are arranged along the circumferential direction with magnetic poles arranged alternately.

In addition, the rotor core 211 has the rotor through-hole 2111. The rotor through-hole 2111 penetrates the rotor core 211 in the axial direction and is connected to the first shaft through-hole 101. The rotor through-hole 2111 is used as a flow path of the fluid F that also functions as the refrigerant. When the rotor 21 rotates, the fluid F flowing through the hollow portion 12 of the shaft 1 can flow into the rotor through-hole 2111 via the first shaft through-hole 101. In addition, the fluid F flowing into the rotor through-hole 2111 can flow out from both axial end portions of the rotor through-hole 2111 to the outside. The fluid F having flowed out flies toward the stator 22 and cools, for example, a coil portion 222 (particularly, the coil end 2221 thereof) and the like. In addition, the fluid F having flowed out flies toward the first motor bearing 4211, the third motor bearing 4311, and the like that rotatably support the shaft 1, and lubricates and cools these bearings 4211 and 4311.

The stator 22 faces the rotor 21 with a gap therebetween in the radial direction. The drive device 100 includes the stator 22. The stator 22 is arranged radially outward of the rotor 21. The stator 22 includes a stator core 221 and the coil portion 222. The stator 22 is held by a first housing tubular portion 41 to be described later. The stator core 221 has a plurality of magnetic pole teeth (not illustrated) extending radially inward from an inner peripheral surface of an annular yoke. The coil portion 222 is formed by winding a conductive wire around the magnetic pole teeth via an insulator (not illustrated). The coil portion 222 has the coil end 2221 protruding from an axial end surface of the stator core 221.

Next, the gear portion 3 is a power transmission device that transmits power of the motor portion 2 to a drive shaft Ds to be described later. The gear portion 3 includes a deceleration device 31 and a differential device 32.

The deceleration device 31 is connected to the shaft 1. The deceleration device 31 has a function of reducing a rotation speed of the motor portion 2 and increasing torque output from the motor portion 2 according a reduction ratio. The deceleration device 31 transmits the torque output from the motor portion 2 to the differential device 32. That is, the gear portion 3 is connected to the one axial side D1 of the shaft 1 that rotates about the rotation axis J1 extending along the horizontal direction.

The deceleration device 31 includes a main drive gear 311, an intermediate driven gear 312, a final drive gear 313, and an intermediate shaft 314. The torque output from the motor portion 2 is transmitted to a ring gear 321 of the differential device 32 via the shaft 1, the main drive gear 311, the intermediate driven gear 312, the intermediate shaft 314, and the final drive gear 313.

The main drive gear 311 is arranged on an outer peripheral surface of the shaft 1. The main drive gear 311 may be the same member as the shaft 1, or may be a separate member and be firmly fixed. The main drive gear 311 rotates about the rotation axis J1 together with the shaft 1.

The intermediate shaft 314 extends along the intermediate axis J2 parallel to the rotation axis J1. Both ends of the intermediate shaft 314 are supported by a first intermediate bearing 4231 and a second intermediate bearing 4621 to be rotatable about an intermediate axis J2. The intermediate driven gear 312 and the final drive gear 313 are arranged on an outer peripheral surface of the intermediate shaft 314. The intermediate driven gear 312 may be the same member as the intermediate shaft 314, or may be a separate member and be firmly fixed thereto.

The intermediate driven gear 312 and the final drive gear 313 rotate integrally with the intermediate shaft 314 about the intermediate axis J2. The intermediate driven gear 312 meshes with the main drive gear 311. The final drive gear 313 meshes with the ring gear 321 of the differential device 32.

The torque of the shaft 1 is transmitted from the main drive gear 311 to the intermediate driven gear 312. Then, the torque transmitted to the intermediate driven gear 312 is transmitted to the final drive gear 313 through the intermediate shaft 314. Further, the torque is transmitted from the final drive gear 313 to the ring gear 321.

The differential device 32 is attached to the drive shaft Ds. The differential device 32 has the ring gear 321. The ring gear 321 transmits the torque transmitted from the deceleration device 31 to the drive shaft Ds. The drive shaft Ds is attached to each of the one axial side D1 and the other axial side D2 of the differential device 32. A drive shaft Ds1 on the one axial side D1 is rotatably supported by a first output bearing 4241 to be described later. A drive shaft Ds2 on the other axial side D2 is rotatably supported by a second output bearing 4631 to be described later. For example, the differential device 32 transmits the torque to the drive shafts Ds1 and Ds2 on both the axial sides while absorbing a rotation speed difference between the drive shafts Ds1 and Ds2 on both the axial sides when the vehicle turns.

A lower end portion of the ring gear 321 is arranged inside a liquid storage portion P to be described later in which the fluid F stored in a lower portion of a gear portion accommodation space 402 is stored (see FIG. 1). For this reason, the fluid F is scraped up by gear teeth of the ring gear 321 when the ring gear 321 rotates. The gears and bearings of the gear portion 3 are lubricated or cooled by the fluid F scraped up by the ring gear 321. A part of the scraped fluid F is stored in a tray portion 464 to be described later, and is also used for cooling the motor portion 2 via the shaft 1.

The housing 4 accommodates the shaft 1, the motor portion 2, and the gear portion 3. The housing 4 includes the first housing tubular portion 41, a side plate 42, the housing lid 43, a cover member 44, a second housing tubular portion 45, and the gear lid 46. Note that the first housing tubular portion 41, the side plate 42, the housing lid 43, the cover member 44, the second housing tubular portion 45, and the gear lid 46 are formed using, for example, a conductive material, and in the present preferred embodiment, are formed using a metal material such as iron, aluminum, or an alloy thereof. In addition, these are preferably formed using the same material in order to suppress contact corrosion of dissimilar metals at the contact portion. However, the present invention is not limited to this example, and these may be formed using materials other than the metal materials, or at least a part of these may be formed using different materials.

The housing 4 accommodates the rotor 21, the stator 22, the third motor bearing 4311, and the like. As described above, the drive device 100 includes the housing 4. Specifically, the housing 4 has a motor accommodation space 401. The motor accommodation space 401 is a space surrounded by the first housing tubular portion 41, the side plate 42, and the housing lid 43, and accommodates the rotor 21, the stator 22, the first motor bearing 4211, the third motor bearing 4311, and the like.

In addition, the housing 4 accommodates the gear portion 3 as described above. Specifically, the housing 4 includes the gear portion accommodation space 402. The gear portion accommodation space 402 is a space surrounded by the side plate 42, the second housing tubular portion 45, and the gear lid 46, and accommodates the deceleration device 31, the differential device 32, and the like.

The liquid storage portion P in which the fluid F is stored is arranged in the lower portion in the gear portion accommodation space 402. A portion of the differential device 32 is immersed in the liquid storage portion P. The fluid F stored in the liquid storage portion P is scraped up by the operation of the differential device 32 and supplied to the inside of the gear portion accommodation space 402. That is, the fluid F is scraped up by a tooth surface of the ring gear 321 when the ring gear 321 of the differential device 32 rotates. A part of the scraped fluid F is supplied to the gears and the bearings of the deceleration device 31 and the differential device 32 in the gear portion accommodation space 402 and used for lubrication. In addition, the other part of the scraped fluid F is supplied to the inside of the shaft 1, and is supplied to the rotor 21 and the stator 22 of the motor portion 2 and the bearings in the gear portion accommodation space 402 to be used for cooling and lubrication.

The first housing tubular portion 41 has a tubular shape extending in the axial direction. The motor portion 2, a fluid reservoir 54 to be described later, and the like are arranged inside the first housing tubular portion 41. In addition, the stator core 221 is fixed to an inner surface of the first housing tubular portion 41.

The side plate 42 covers the other axial end portion of the first housing tubular portion 41 and covers one axial end portion of the second housing tubular portion 45. The side plate 42 expands in a direction intersecting the rotation axis J1 and divides the first housing tubular portion 41 from the second housing tubular portion 45. In the present preferred embodiment, the first housing tubular portion 41 and the side plate 42 are different parts of the single member. Since these are integrally formed, the rigidity thereof can be enhanced. However, the present invention is not limited to this example, and both may be separate members.

The side plate 42 has a side plate through-hole 4201 through which the shaft 1 is inserted and a first drive shaft through-hole 4202. The side plate through-hole 4201 and the first drive shaft through-hole 4202 penetrates the side plate 42 in the axial direction. The center of the side plate through-hole 4201 coincides with the rotation axis J1. The shaft 1 is inserted through the side plate through-hole 4201. The center of the first drive shaft through-hole 4202 coincides with a drive axis J3. The drive shaft Ds1 on the one axial side D1 is inserted through the first drive shaft through-hole 4202. An oil seal (not illustrated) for sealing between the drive shaft Ds1 and the first drive shaft through-hole 4202 is arranged in a gap therebetween.

In addition, the side plate 42 further includes a first motor bearing holder 421, a second motor bearing holder 422, a first intermediate bearing holder 423, and a first output bearing holder 424. The first motor bearing holder 421 is arranged on the one axial side D1 of the side plate through-hole 4201 on the side plate 42 and holds the first motor bearing 4211. The second motor bearing holder 422 is arranged along an outer edge of the other axial end portion of the side plate through-hole 4201 and holds the second motor bearing 4221. The first intermediate bearing holder 423 is arranged on the other axial end surface of the side plate 42 and holds the first intermediate bearing 4231. The first output bearing holder 424 is arranged along an outer edge of the other axial end portion of the first drive shaft through-hole 4202 on the side plate 42, and holds the first output bearing 4241. The first motor bearing 4211, the second motor bearing 4221, the first intermediate bearing 4231, and the first output bearing 4241 are ball bearings in the present preferred embodiment.

The housing lid 43 expands in a direction intersecting the rotation axis J1 and covers one axial end portion of the first housing tubular portion 41. The housing lid 43 is attached to the one axial end portion of the first housing tubular portion 41. The housing lid 43 can be fixed to the first housing tubular portion 41 by, for example, a screw, but is not limited thereto, and a method of firmly fixing the housing lid 43 to the first housing tubular portion 41, such as screwing or press-fitting, can be widely adopted. As a result, the housing lid 43 can be brought into close contact with the one axial end portion of the first housing tubular portion 41. Note that the term "close contact" means to have such a sealing property to an extent that the fluid F inside the members does not leak to the outside and to an extent that foreign matter such as external water, dirt, or dust does not enter. It is assumed that the same is applied below for the close contact.

In addition, the housing lid 43 includes the third motor bearing holder 431. The third motor bearing holder 431 is arranged on the other axial end surface of the housing lid 43. The motor includes the third motor bearing holder 431. The third motor bearing holder 431 holds the third motor bearing 4311. The third motor bearing holder 431 is an example of a "bearing holder" of the present invention. That is, the drive device 100 includes the third motor bearing 4311. The third motor bearing 4311 rotatably supports the shaft 1. The third motor bearing 4311 is an example of a "bearing" of the present invention, and is a ball bearing in the present preferred embodiment.

The third motor bearing holder 431 has the opening 4312 through which the shaft 1 is inserted. The opening 4312 penetrates the housing lid 43 in the axial direction and surrounds the rotation axis J1 when viewed from the axial direction.

The housing lid 43 further includes a detector holder 432 and a recess 433. In the present preferred embodiment, the detector holder 432 and the recess 433 are steps arranged on the one axial side D1 of the housing lid 43. These steps have an annular shape surrounding the rotation axis J1. The detector holder 432 holds the rotation detector 7. The recess 433 is arranged on the one axial side D1 of the housing lid 43 and is recessed to the other axial side D2. The opening 4312 communicates with the detector holder 432 and the recess 433.

The cover member 44 is attached to one axial end surface of the housing lid 43. The cover member 44 can be attached to the housing lid 43 by, for example, screwing, but is not limited thereto, and a method of firmly fixing the cover member 44 to the housing lid 43, such as screwing or press-fitting, can be widely adopted. In the present preferred embodiment, the cover member 44 forms the space 403 together with the housing lid 43. The space 403 is a space surrounded by the housing lid 43 and the cover member 44, and accommodates the one axial end portion of the shaft 1, the rotation detector 7, the seal member 8, and the like.

The cover member 44 includes a plate portion 441 and a plate recess 442. The plate portion 441 has a plate shape expanding in a direction intersecting the rotation axis J1, and expands in the radial direction from the rotation axis J1 in the present preferred embodiment. The plate portion 441 is arranged on the one axial side D1 with respect to the one axial end portion of the shaft 1, and covers the opening 4312 and the one axial end portion of the shaft 1. The plate recess 442 is arranged on the other axial side D2 of the plate portion 441 and is recessed to the one axial side D1 to surround the rotation axis J1. The plate recess 442 accommodates one axial end portion of the shaft tubular portion 11 and the first neutralizing device 6.

The second housing tubular portion 45 has a tubular shape surrounding the rotation axis J1 and extends in the axial direction. The one axial end portion of the second housing tubular portion 45 is connected to the side plate 42 and covered with the side plate 42. In the present preferred embodiment, the second housing tubular portion 45 is detachably attached to the other axial end portion of the side plate 42. In addition, the second housing tubular portion 45 can be attached to the side plate 42 by, for example, fixing with a screw, but is not limited thereto, and a method of firmly fixing the second housing tubular portion 45 to the side plate 42, such as screwing or press-fitting, can be widely adopted. As a result, the second housing tubular portion 45 can be brought into close contact with the other axial end portion of the side plate 42.

The gear lid 46 expands in a direction intersecting the rotation axis J1. The gear portion 3 is arranged inside the second housing tubular portion 45 and the gear lid 46. In the present preferred embodiment, the second housing tubular portion 45 and the gear lid 46 are different parts of the single member. However, the present invention is not limited to this example, and the second housing tubular portion 45 and the gear lid 46 may be separate members.

The gear lid 46 includes a second drive shaft through-hole 460. The center of the second drive shaft through-hole 460 coincides with the drive axis J3. The drive shaft Ds is inserted through the second drive shaft through-hole 460. An oil seal (not illustrated) for sealing between the drive shaft Ds2 on the other axial side D2 and the second drive shaft through-hole 460 is arranged in a gap therebetween.

The gear lid 46 further includes a fourth motor bearing holder 461, a second intermediate bearing holder 462, and a second output bearing holder 463. These bearing holders 461, 462, and 463 are arranged on one axial end surface of the gear lid 46 in the gear portion accommodation space 402. The fourth motor bearing holder 461 and the second intermediate bearing holder 462 are arranged on the one axial end surface of the gear lid 46. The fourth motor bearing holder 461 holds the fourth motor bearing 4611. The second intermediate bearing holder 462 holds the second intermediate bearing 4621. The second output bearing holder 463 is arranged along an outer edge of one axial end portion of the second drive shaft through-hole 460 in the gear lid 46, and holds the second output bearing 4631. The fourth motor bearing 4611, the second intermediate bearing 4621, and the second output bearing 4631 are ball bearings in the present preferred embodiment.

The gear lid 46 includes the tray portion 464 and the flow passage 465. The tray portion 464 is arranged in the one axial end surface of the gear lid 46 and has a recess recessed vertically downward. The tray portion 464 can store the fluid F scraped up by the ring gear 321. The flow passage 465 is a passage for the fluid F and connects the tray portion 464 and the inlet 111 of the shaft 1. The fluid F stored in the tray portion 464 is supplied to the flow passage 465 and flows into the hollow portion 12 from the inlet 111 at the other axial end portion of the shaft 1.

Next, the liquid circulation portion 5 will be described. The liquid circulation portion 5 includes a pipe 51, a pump 52, a cooler unit 53, and the fluid reservoir 54.

The pipe 51 connects the pump 52 and the fluid reservoir 54 arranged inside the first housing tubular portion 41, and supplies the fluid F to the fluid reservoir 54. The pump 52 sucks the fluid F stored in a lower region of the gear portion accommodation space 402. The pump 52 is an electric pump, but is not limited thereto. For example, the pump 52 may be configured to be driven by utilizing a part of the power of the shaft 1 of the drive device 100.

The cooler unit 53 is arranged between the pump 52 and the fluid reservoir 54 in the pipe 51. That is, the fluid F sucked by the pump 52 passes through the cooler unit 53 via the pipe 51 and then is sent to the fluid reservoir 54. For example, a refrigerant such as water supplied from the outside is supplied to the cooler unit 53. The cooler unit 53 exchanges heat between the refrigerant and the fluid F to lower the temperature of the fluid F.

The fluid reservoir 54 is a tray arranged vertically above the stator 22 inside the motor accommodation space 401. A dropping hole (whose reference sign is omitted) is formed at a bottom of the fluid reservoir 54, and the motor portion 2 is cooled by dropping the fluid F from the dropping hole. The dropping hole is formed above the coil end 2221 of the coil portion 222 of the stator 22, for example, and the coil portion 222 is cooled by the fluid F.

Figure 4A:
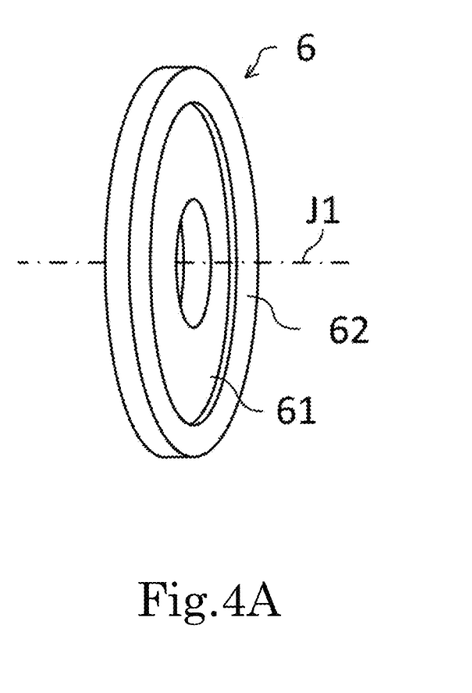
FIG. 4A is a perspective view illustrating an example of a first neutralizing device according to the preferred embodiment.
Figure 4B:
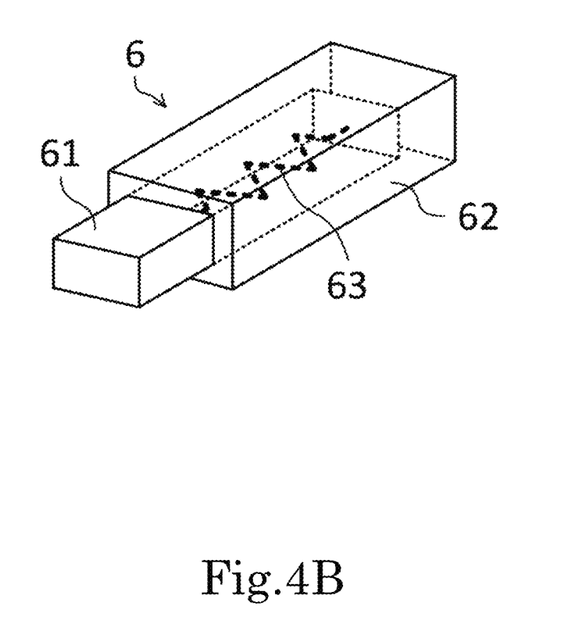
FIG. 4B is a perspective view illustrating an example of a first neutralizing device according to a modification.

Next, the first neutralizing device 6 will be described with reference to FIGS. 2A, 2B, 4A, and 4B. FIG. 4A is a perspective view illustrating an example of the first neutralizing device 6 according to the preferred embodiment. FIG. 4B is a perspective view illustrating a modification of the first neutralizing device 6.

The first neutralizing device 6 is arranged radially outward of the shaft tubular portion 11. The first neutralizing device 6 is arranged on the one axial side D1 with respect to the third motor bearing 4311, and electrically connects the shaft 1 and the housing 4. As described above, the drive device 100 includes the first neutralizing device 6. Since it is unnecessary to arrange the first neutralizing device 6 between the shaft wall 13 and the cover member 44 in the axial direction, it is possible to suppress an increase in axial size of the drive device 100.

The first neutralizing device 6 contacts the shaft 1 and the cover member 44 and is electrically connected to the both. For example, the first neutralizing device 6 is accommodated in the plate recess 442 of the cover member 44. As a result, it is possible to further suppress the increase in the axial size of the drive device 100. In the present preferred embodiment, a radially inner end portion of the first neutralizing device 6 contacts an outer peripheral surface of the shaft tubular portion 11 as illustrated in FIGS. 2A and 2B. In addition, a radially outer end portion of the first neutralizing device 6 contacts the cover member 44. In the present preferred embodiment, the radially outer end portion of the first neutralizing device 6 contacts an inner peripheral surface of the plate recess 442 facing radially inward, and one axial end portion of the first neutralizing device 6 contacts an inner bottom surface of the plate recess 442 facing the other axial side D2. Since the first neutralizing device 6 contacts both the inner peripheral surface and the inner bottom surface of the plate recess 442, the contact area between the first neutralizing device 6 and the cover member 44 can be further increased. Therefore, the electrical conductivity between the both can be further enhanced, and thus, an effect of eliminating static electricity of the shaft 1 by the first neutralizing device 6 can be improved. However, the present invention is not limited to the examples of FIGS. 2A and 2B, and the first neutralizing device 6 may contact only one of the inner peripheral surface and the inner bottom surface of the plate recess 442.

In the present preferred embodiment, the first neutralizing device 6 includes a conductive member 61 and a holding member 62 having conductivity. The holding member 62 holds the conductive member 61.

The conductive member 61 may have, for example, a brush shape including a plurality of fibers extending in the radial direction, or may be a molded body. The conductive member 61 is formed using a material having conductivity. As the material of the conductive member 61, a material having good slidability is preferably used, and a material having a low friction coefficient is more preferably used. As the material of the conductive member 61, for example, a composite resin containing a conductive filler such as a carbon fiber or metal can be adopted. The holding member 62 is made of metal, for example, and accommodates a part of the conductive member 61 therein.

In the present preferred embodiment, a tip end (that is, a radially inner end portion) of the conductive member 61 contacts the outer peripheral surface of the shaft tubular portion 11. The holding member 62 is fixed to the cover member 44 (the inner peripheral surface and/or the inner bottom surface of the plate recess 442). However, the present invention is not limited to the example of the present preferred embodiment, and the tip end (that is, the radially outer end portion) of the conductive member 61 may contact the cover member 44 (for example, the inner peripheral surface and/or the inner bottom surface of the plate recess 442), and the holding member 62 may be fixed to the outer peripheral surface of the shaft tubular portion 11.

In the present preferred embodiment, the first neutralizing device 6 has an annular shape surrounding the rotation axis J1, and is fitted to the inner peripheral surface of the plate recess 442. Then, since the annular first neutralizing device 6 can be fitted into the inner peripheral surface of the plate recess 442, the first neutralizing device 6 can be stably fixed inside the shaft tubular portion 11.

For example, as illustrated in FIG. 4A, the conductive member 61 and the holding member 62 have an annular shape centered on the rotation axis J1. The radially outer side of the conductive member 61 is held by a radially inner end portion of the holding member 62. The radially inner side of the conductive member 61 expands radially inward from the radially inner end portion of the holding member 62. A radially outer end portion of the holding member 62 is fitted to the inner peripheral surface of the shaft tubular portion 11.

However, the present invention is not limited to the example of FIG. 4A, and the radially outer end portion of the conductive member 61 may be fitted to the inner peripheral surface of the shaft tubular portion 11. At this time, the radially inner side of the conductive member 61 is held by the radially outer end portion of the holding member 62, and the radially outer side of the conductive member 61 expands radially outward from the radially outer end portion of the holding member 62.

In addition, the present invention is not limited to the example of FIG. 4A, and the first neutralizing device 6 does not necessarily have the annular shape. For example, the first neutralizing device 6 may have a rectangular parallelepiped shape as illustrated in FIG. 4B, or may have an arc shape centered on the rotation axis J1 and extending in the circumferential direction. For example, in a partial region in the circumferential direction, the conductive member 61 contacts the outer peripheral surface of the shaft tubular portion 11, and the holding member 62 is fixed to the cover member 44. Conversely, in a partial region in the circumferential direction, the conductive member 61 may contact the cover member 44, and the holding member 62 may be fixed to the outer peripheral surface of the shaft tubular portion 11. Since the conductive member 61 contacts the outer peripheral surface of the shaft tubular portion 11 or the cover member 44 in a partial region in the circumferential direction, the sliding area of the conductive member 61 per rotation of the shaft 1 can be further reduced. Therefore, it is possible to reduce wear debris generated at the contact portion between the conductive member 61 and the shaft tubular portion 11 or the cover member 44.

The first neutralizing device 6 may further include an elastic member 63 (see FIG. 4B). The elastic member 63 is accommodated inside the holding member 62 in a compressed state. Due to the elasticity, the elastic member 63 pushes the conductive member 61 toward the shaft 1 or the cover member 44 (the inner peripheral surface of the plate recess 442). As the elastic member 63, a spring coil, a leaf spring, rubber, or the like can be adopted. Although the elastic member 63 is not illustrated in FIG. 4A, the first neutralizing device 6 of FIG. 4A may have the elastic member 63 as in FIG. 4B. However, these examples do not exclude a configuration in which the first neutralizing device 6 does not include the elastic member 63.

The rotation detector 7 is attached to the one axial side D1 of the housing lid 43. As described above, the drive device 100 includes the rotation detector 7. The rotation detector 7 detects a rotation angle of the shaft 1. The rotation detector 7 is arranged between the third motor bearing holder 431 and the first neutralizing device 6 in the axial direction. Then, the rotation angle of the shaft 1 can be detected by the rotation detector 7 arranged between the third motor bearing 4311 and the first neutralizing device 6.

Preferably, the rotation detector 7 is arranged on the one axial side D1 with respect to the seal member 8 (see FIGS. 2A and 2B). Then, the rotation detector 7 such as a resolver can be arranged in a space divided from the third motor bearing 4311 by the seal member 8. For example, the rotation detector 7 can be arranged in the space 403 in which the first neutralizing device 6 is arranged. Therefore, it is possible to suppress or prevent the fluid F for lubricating the third motor bearing 4311 from being applied to the rotation detector 7. However, this example does not exclude a configuration in which the rotation detector 7 is arranged on the other axial side D2 with respect to the seal member 8.

In the present preferred embodiment, the rotation detector 7 is a resolver including a resolver rotor and a resolver stator. The rotation detector 7 includes the resolver rotor (not illustrated) fixed to the shaft 1 and the resolver stator (not illustrated) fixed to the housing lid 43 of the housing 4. The resolver rotor and the resolver stator have an annular shape. An inner peripheral surface of the resolver stator radially faces an outer peripheral surface of the resolver rotor. The resolver stator periodically detects a rotation angle position of the resolver rotor when the rotor 21 rotates. As a result, the rotation detector 7 acquires information on the rotation angle position of the rotor 21. Note that the present invention is not limited to the example of the present preferred embodiment, and the rotation detector 7 is not necessarily the resolver, and may be, for example, a rotary encoder or the like.

The seal member 8 is arranged between the third motor bearing 4311 and the first neutralizing device 6 in the axial direction. As described above, the drive device 100 further includes the seal member 8. The seal member 8 divides the third motor bearing holder 431 from the space 403 in which the rotation detector 7 is arranged. Specifically, the seal member 8 has an annular shape surrounding the rotation axis J1 and covers a gap between the shaft 1 and the housing lid 43 (in other words, an inner peripheral surface of the opening 4312). Then, the seal member 8 arranged between the third motor bearing 4311 and the first neutralizing device 6 can isolate the first neutralizing device 6 from the third motor bearing 4311. Therefore, it is possible to suppress or prevent the fluid F for lubricating the third motor bearing 4311 from being applied to the first neutralizing device 6. Thus, the first neutralizing device 6 can maintain good electrical connection with the shaft 1. That is, it is possible to suppress or prevent deterioration in efficiency of eliminating the static electricity of the shaft 1. Further, the seal member 8 can also suppress or prevent the fluid F for lubricating the third motor bearing 4311 from being applied to the rotation detector 7.

In the present preferred embodiment, the seal member 8 is arranged outside the one axial end portion of the opening 4312. However, the arrangement of the seal member 8 is not limited to the example of the present preferred embodiment. For example, the seal member 8 may be arranged inside the opening 4312. Preferably, the seal member 8 is arranged on the one axial side D1 with respect to the radially outer end portion of the second shaft through-hole 102. Then, it is possible to suppress or prevent the fluid F flowing out from the second shaft through-hole 102 from being applied to the rotation detector 7. However, this example does not exclude a configuration in which the seal member 8 is arranged on the other axial side D2 with respect to the radially outer end portion of the second shaft through-hole 102.

In the present preferred embodiment, a so-called slinger is used for the seal member 8. For example, the seal member 8 has a fixed portion 81. The fixed portion 81 is fixed to the radially outer surface of the shaft 1. The fixed portion 81 has a tubular shape extending in the axial direction. The seal member 8 further includes a flange portion 82. The flange portion 82 expands radially outward from the fixed portion 81 and covers the gap between (the inner peripheral surface of) the opening 4312 and the shaft 1. Since the gap between the opening 4312 and the shaft 1 is covered with the flange portion 82 extending radially outward from the fixed portion 81, the fluid F for lubricating the third motor bearing 4311 hardly enters the space 403 in which the first neutralizing device 6 is arranged from the third motor bearing holder 431.

However, the seal member 8 is not limited to this example. As the seal member 8, an oil seal, a mechanical seal, a packing, or the like may be used. Alternatively, the seal member 8 may be a part of the third motor bearing 4311. That is, the third motor bearing 4311 may be a seal-type ball bearing including the seal member 8. Alternatively, the seal member 8 may be a part of the first neutralizing device 6. For example, the seal member 8 may be a covering film that covers the surface of the first neutralizing device 6 for sealing from the space 403.

Figure 5:
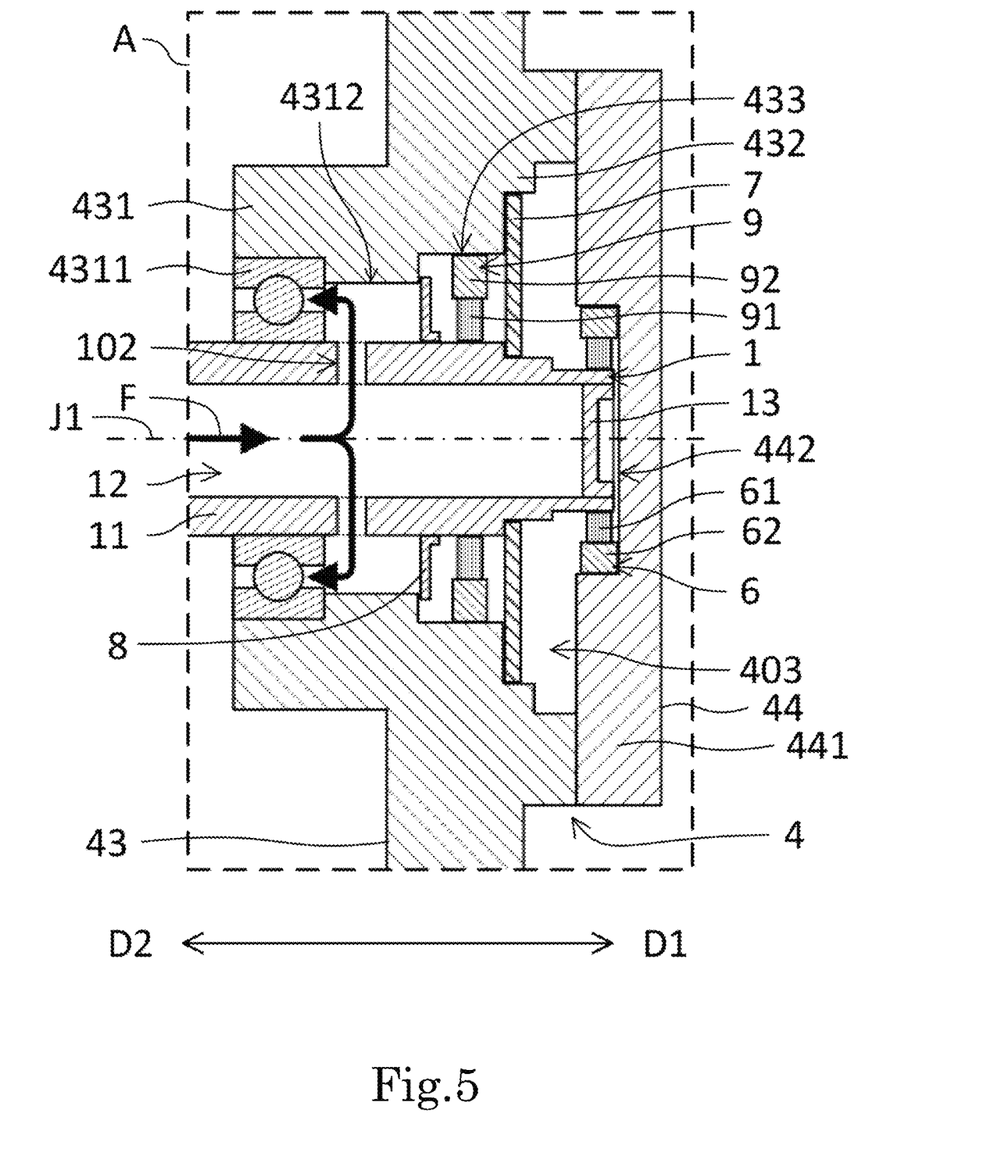
FIG. 5 is a conceptual diagram illustrating a shaft neutralizing structure of a drive device according to the modification.

Next, a modification of the preferred embodiment will be described with reference to FIG. 5. FIG. 5 is a conceptual diagram illustrating a shaft neutralizing structure according to the modification. Note that FIG. 5 is a merely conceptual diagram, and a layout and a dimension of each portion are not necessarily identical to those of the actual drive device 100 in a strict sense. FIG. 5 corresponds to the portion A surrounded by the broken line in FIG. 1. Hereinafter, a configuration different from that of the above-described preferred embodiment will be described. In addition, the same components as those in the above-described preferred embodiment are denoted by the same reference signs, and the description thereof may be omitted.

In the modification, the drive device 100 further includes a second neutralizing device 9. The second neutralizing device 9 is arranged between the third motor bearing 4311 and the first neutralizing device 6 in the axial direction, and electrically connects the shaft 1 and the housing 4. For example, as illustrated in FIG. 5, the second neutralizing device 9 is arranged between the housing lid 43 and the shaft tubular portion 11 in the radial direction. Since the second neutralizing device 9 is further arranged separately from the first neutralizing device 6, the shaft 1 can be electrically connected to the housing 4 more reliably. Therefore, the effect of eliminating the static electricity of the shaft 1 can be enhanced.

Preferably, the second neutralizing device 9 is arranged on the one axial side D1 with respect to the seal member 8. The second neutralizing device 9 contacts the shaft 1 and the housing lid 43 and is electrically connected to the both. As illustrated in FIG. 5, the second neutralizing device 9 is fixed to one of the housing lid 43 (the inner peripheral surface of the opening 4312) and the shaft tubular portion 11, and contacts the other of the housing lid 43 (the inner peripheral surface of the opening 4312) and the shaft tubular portion 11. Then, the second neutralizing device 9 can be arranged in a space divided from the third motor bearing 4311 by the seal member 8. For example, the second neutralizing device 9 can be arranged in the space 403 in which the second neutralizing device 9 is arranged. Therefore, it is possible to suppress or prevent the fluid F for lubricating the third motor bearing 4311 from being applied to the second neutralizing device 9.

In the present preferred embodiment, the second neutralizing device 9 is arranged between the rotation detector 7 and the seal member 8 in the axial direction as illustrated in FIG. 5. That is, the second neutralizing device 9 is arranged on the other axial side D2 with respect to the rotation detector 7. However, the present invention is not limited to the example of FIG. 5, and the second neutralizing device 9 may be arranged, for example, between the first neutralizing device 6 and the rotation detector 7 in the axial direction.

In addition, the present invention is not limited to the above-described example, and the second neutralizing device 9 may be arranged on the other axial side D2 with respect to the seal member 8. For example, the second neutralizing device 9 may be arranged between the third motor bearing 4311 and the seal member 8 in the axial direction. In addition, the second neutralizing device 9 may be arranged in the opening 4312.

The second neutralizing device 9 includes a conductive member 91 and a holding member 92 having conductivity. The holding member 92 holds the conductive member 91. The second neutralizing device 9 may have the same configuration as the first neutralizing device 6 or may have a different configuration from the first neutralizing device 6.

The conductive member 91 may have, for example, a brush shape including a plurality of fibers extending in the radial direction, or may be a molded body. The conductive member 91 is formed using a material having conductivity. As the material of the conductive member 91, a material having good slidability is preferably used, and a material having a low friction coefficient is more preferably used. As the material of the conductive member 91, for example, a composite resin containing a conductive filler such as a carbon fiber or metal can be adopted. The holding member 92 is made of metal, for example, and accommodates a part of the conductive member 91 therein.

In FIG. 5, a tip end (that is, a radially inner end portion) of the conductive member 91 contacts the outer peripheral surface of the shaft tubular portion 11. The holding member 92 is fixed to the housing lid 43 (the inner peripheral surface of the opening 4312). However, the present invention is not limited to the example of FIG. 5, and the tip end (that is, the radially outer end portion) of the conductive member 91 may contact the housing lid 43 (the inner peripheral surface of the opening 4312), and the holding member 92 may be fixed to the outer peripheral surface of the shaft tubular portion 11.

In FIG. 5, the second neutralizing device 9 has an annular shape surrounding the rotation axis J1, and is fitted to an inner peripheral surface of the recess 433 of the housing lid 43. Since the second neutralizing device 9 is fitted to the recess 433, the second neutralizing device 9 can be stably fixed to the housing lid 43.

The conductive member 91 and the holding member 92 in FIG. 5 have an annular shape centered on the rotation axis J1, which is similar to those of the first neutralizing device 6 in FIG. 4A. However, the present invention is not limited to this example, and the second neutralizing device 9 does not necessarily have the annular shape. For example, the second neutralizing device 9 may have a rectangular parallelepiped shape similarly to the first neutralizing device 6 in FIG. 4B, or may have an arc shape centered on the rotation axis J1 and extending in the circumferential direction. Then, the conductive member 91 contacts the shaft tubular portion 11 or the housing lid 43 in a partial region in the circumferential direction. For this reason, the sliding area of the conductive member 91 per rotation of the shaft 1 can be further reduced. Therefore, it is possible to reduce wear debris generated at the contact portion between the conductive member 91 and the shaft 1 or the housing lid 43.

The second neutralizing device 9 may further include an elastic member (not illustrated) similarly to the first neutralizing device 6 in FIG. 4B. The elastic member is accommodated inside the holding member 92 in a compressed state. Due to the elasticity, the elastic member pushes the conductive member 91 toward the shaft 1 or the housing lid 43 (the inner peripheral surface of the opening 4312).

The preferred embodiment of the present invention has been described above. Note that the scope of the present invention is not limited to the above-described preferred embodiment. The present invention can be implemented by making various modifications to the above-described preferred embodiment within a range not departing from the gist of the invention. In addition, the matters described in the above-described preferred embodiment can be arbitrarily combined together as appropriate within a range where no inconsistency occurs.

In the present preferred embodiment and the modification, the present invention is applied to the in-vehicle drive device 100. However, the present invention is not limited to this example, and the present invention is also applicable to drive devices or the like used for applications other than in-vehicle applications.

The present invention is useful for a device that grounds a rotatable shaft. In addition, the present invention is useful for a drive device mounted on a vehicle, and is also useful for drive devices used for applications other than in-vehicle applications.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
   a shaft extending in an axial direction along a rotation axis;
   a rotor fixed to the shaft and rotatable about the rotation axis;
   a stator facing the rotor in a radial direction with a gap between the stator and the rotor;
   a bearing rotatably supporting the shaft;
   a housing accommodating the rotor, the stator, and the bearing;
   a first neutralizing device that is arranged on one axial side of the bearing and electrically connects the shaft and the housing; and
   a seal member arranged between the bearing and the first neutralizing device in the axial direction, and
   the shaft includes:
      a shaft tubular portion that has a tubular shape surrounding the rotation axis; and
      a shaft through-hole penetrating the shaft tubular portion in the radial direction or in a direction obliquely intersecting the radial direction and the axial direction, and
      the seal member is arranged next to the bearing with a gap in the axial direction, and
      a radially outer end portion of the shaft through-hole is connected between one axial end of the bearing and the seal member.

2. The drive device according to claim 1, wherein
   the housing includes a bearing holder that holds the bearing,
   the bearing holder has an opening through which the shaft is inserted, and
   the seal member includes:
   a fixed portion fixed to a radially outer surface of the shaft; and
   a flange portion that expands radially outward from the fixed portion and covers a gap between the opening and the shaft.

3. A drive device comprising:
   a shaft extending in an axial direction along a rotation axis;
   a rotor fixed to the shaft and rotatable about the rotation axis;
   a stator facing the rotor in a radial direction with a gap between the stator and the rotor;
   a bearing rotatably supporting the shaft;
   a housing accommodating the rotor, the stator, and the bearing;
   a first neutralizing device that is arranged on one axial side of the bearing and electrically connects the shaft and the housing; and
   a seal member arranged between the bearing and the first neutralizing device in the axial direction, and
   a rotation detector that detects a rotation angle of the shaft,
   wherein the rotation detector is arranged between the bearing and the first neutralizing device in the axial direction.

4. The drive device according to claim 3, wherein
   the rotation detector is arranged on the one axial side of the seal member.

5. A vehicle comprising the drive device according to claim 3.

6. The drive device according to claim 1, further comprising
   a second neutralizing device that is arranged between the bearing and the first neutralizing device in the axial direction and electrically connects the shaft and the housing.

7. The drive device according to claim 6, wherein
   the second neutralizing device is arranged on the one axial side of the seal member.

8. A vehicle comprising
   the drive device according to claim 1.

9. A drive device comprising:
   a shaft extending in an axial direction along a rotation axis;
   a rotor fixed to the shaft and rotatable about the rotation axis;
   a stator facing the rotor in a radial direction with a gap between the stator and the rotor;
   a bearing rotatably supporting the shaft;
   a housing accommodating the rotor, the stator, and the bearing;
   a first neutralizing device that is arranged on one axial side of the bearing and electrically connects the shaft and the housing; and
   a seal member arranged between the bearing and the first neutralizing device in the axial direction, and
   the shaft includes:
   a shaft tubular portion that has a tubular shape surrounding the rotation axis; and
   a shaft through-hole penetrating the shaft tubular portion in the radial direction or in a direction obliquely intersecting the radial direction and the axial direction, and
   the shaft further includes a shaft wall that is arranged inside the shaft tubular portion and expands in the radial direction, and
   the shaft wall is arranged at an axial position identical to the seal member or on the one axial side of a radially inner end portion of the shaft through-hole and on another axial side of the seal member.

10. A vehicle comprising the drive device according to claim 9.

11. A drive device comprising:
    a shaft extending in an axial direction along a rotation axis;
    a rotor fixed to the shaft and rotatable about the rotation axis;
    a stator facing the rotor in a radial direction with a gap between the stator and the rotor;
    a bearing rotatably supporting the shaft;
    a housing accommodating the rotor, the stator, and the bearing;

a first neutralizing device that is arranged on one axial side of the bearing and electrically connects the shaft and the housing; and a seal member arranged between the bearing and the first neutralizing device in the axial direction, a shaft extending in an axial direction along a rotation axis;

a rotor fixed to the shaft and rotatable about the rotation axis;

a stator facing the rotor in a radial direction with a gap between the stator and the rotor;

a bearing rotatably supporting the shaft;

a housing accommodating the rotor, the stator, and the bearing;

a first neutralizing device that is arranged on one axial side of the bearing and electrically connects the shaft and the housing; and a seal member arranged between the bearing and the first neutralizing device in the axial direction, and a rotation detector that detects a rotation angle of the shaft, the rotation detector is arranged on the one axial side of the first neutralizing device.

12. The drive device according to claim 11, wherein a second neutralizing device that is arranged on one axial side of the rotation detector and electrically connects the shaft and the housing.

13. A vehicle comprising the drive device according to claim 11.

* * * * *